United States Patent

Arai et al.

[11] Patent Number: 5,181,870
[45] Date of Patent: Jan. 26, 1993

[54] COWLING AND AIR INLET DEVICE FOR OUTBOARD MOTOR

[75] Inventors: Hideto Arai; Seiji Kobayashi, both of Hamamatsu, Japan

[73] Assignee: Sanshin Kogyo Kabushiki Kaisha, Hamamatsu, Japan

[21] Appl. No.: 707,272

[22] Filed: May 24, 1991

Related U.S. Application Data

[63] Continuation of Ser. No. 498,995, Mar. 26, 1990, abandoned.

[30] Foreign Application Priority Data

Mar. 25, 1989 [JP] Japan ................................. 1-73176

[51] Int. Cl.⁵ ............................................. B63H 21/24
[52] U.S. Cl. ...................................... 440/77; 440/900; 440/88
[58] Field of Search ........................... 440/77, 88, 900; 123/195 C, 195 P; 181/69.2, 69, 22, 204, 229, 264, 267

[56] References Cited

U.S. PATENT DOCUMENTS 3,610,198 10/1971 Alexandrowicz .................... 440/77
4,571,193 2/1986 Takada et al. ......................... 440/77

Primary Examiner—Edwin L. Swinehart
Attorney, Agent, or Firm—Ernest A. Beutler

[57] ABSTRACT

Three embodiments of a cowling and air inlet device for a power head of an outboard motor are disclosed and described which include an air inlet formed in an upper rear surface of the cowling and an air intake duct formed within the air inlet for supplying air to the engine induction system. Various arrangements of partitions are provided within the air inlet for permitting adequate air flow to the engine induction system but preventing water from entering the interior of the cowling and engine induction system. A cover portion which may be separate or part of the upper surface of the cowling is positioned above the air intake duct and at least a portion of the cover is higher than the upper surface of the cowling. This cover portion also has at least one opening therein for permitting air from the atmosphere to enter the air inlet. These cowling and air device arrangements provide a sufficiently large space between the top of the air intake duct and the cover portion to reduce noise resulting from the flow of air around the top of the air intake duct.

7 Claims, 5 Drawing Sheets

COWLING AND AIR INLET DEVICE FOR OUTBOARD MOTOR

This is a continuation of U.S. patent application Ser. No. 07/498,995, filed Mar. 26, 1990, now abandoned.

BACKGROUND OF THE INVENTION

This invention relates to a cowling for an outboard motor, and more particularly to an improved protective cowling and air inlet device for the power head of an outboard motor.

It is well known with outboard motors that the powering internal combustion engine is normally enclosed within a protective cowling so as to provide protection for the internal combustion engine and a better appearance for the outboard motor. The protective cowling defines a cavity in which the internal combustion engine is contained. It is also well known that the engine must be supplied with copious amounts of air for the engine induction system.

Conventionally, the protective cowling includes an air inlet positioned in the upper rear portion thereof. This air inlet generally has an upwardly and rearwardly facing opening and may have sidewardly facing openings as well to permit air to flow into the air inlet for supply to the engine induction system. Oftentimes, an air intake duct is mounted within the air inlet and extends upwardly to define an opening at the top thereof for supplying air into the cavity of the protective cowling and to the engine induction system. A cover is typically provided which extends horizontally and in the same general plane as the upper surface of the cowling. This cover is positioned above the air intake duct to prevent foreign objects from falling into the duct and for preventing water from entering into the interior of the cowling and damaging the engine and/or entering the engine induction system.

Although such arrangements are generally satisfactory in permitting air flow to the engine induction system but preventing water and foreign objects from reaching the induction system, under some operating conditions, such arrangements generally do not provide sufficient space between the top of the air intake duct and the cover to prevent the generation of unnecessary and unwanted noise resulting from the flow of air around the top of the air intake duct.

It is, therefore, a principal object of this invention to provide an improved cowling and air inlet device for the power head of an outboard motor which will provide a sufficiently large space between the top of the air intake duct and the duct cover to reduce noises resulting from the flow of air around the top of the air intake duct.

It is a further object of this invention to provide an improved cowling and air inlet device for the power head of an outboard motor which offers adequate air flow and space around the top of the air intake duct and yet will insure that water cannot enter the engine induction system or the cavity which surrounds the engine.

SUMMARY OF THE INVENTION

A first embodiment of this invention is adapted to be embodied in a cowling and air inlet device for the power head of an outboard motor that has an internal combustion engine including an induction system. Air inlet means is formed in an upper rear portion of the cowling and is open to the rearward for inducting air from the atmosphere. Air intake means, preferably in the form of an air intake duct, is formed within the air inlet means for supplying air to the induction system. In accordance with the invention, a cover is provided having at least one air supply opening formed therein, preferably in the forward portion thereof. The cover is secured to the cowling for covering the air intake duct and at least a portion of the top of the cover is positioned higher than an upper surface of the cowling to define a flow path for air through the air inlet means to the air intake duct. Preferably, a pair of partition plates are positioned within the air inlet means, one forwardly and one rearwardly of the air intake duct.

A second embodiment of the invention is also adapted to be embodied in a cowling and air inlet device for the power head of an outboard motor which has an internal combustion engine including an induction system. This embodiment includes air inlet means formed in an upper rear portion of the cowling. Air intake means, preferably in the form of a duct, is formed within the air inlet means for supplying air to the engine induction system. In accordance with this embodiment of the invention, a pair of partition plates are positioned within the air inlet means, one on each side of the air intake duct. A cover is also provided, and in this embodiment, the cover has a pair of air supply openings formed therein, one on each side, for inducting atmospheric air into the air inlet means. The cover is secured to the cowling for covering the air intake means and at least a portion of the top of the cover is positioned higher than an upper surface of the cowling to define a flow path for air through the air inlet means to the air intake duct.

A third embodiment includes a cowling and air inlet device for the power head of an outboard motor which has an internal combustion engine including an induction system. Air inlet means are formed in an upper rear portion of the cowling and is open to the rear for inducting air from the atmosphere. Air intake means, preferably in the form of a duct, is formed within the air inlet means for supplying air to the engine induction system. In accordance with this third embodiment of the invention, a partition member is positioned within the air inlet means and surrounds the air intake duct. This partition member extends downwardly from a cover which covers the air intake duct and which has at least one air supply opening formed therein. At least a portion of the cover is higher than an upper surface of the cowling.

DETAILED DESCRIPTION OF THE PREFERRED EMBODIMENTS

Figure 1:
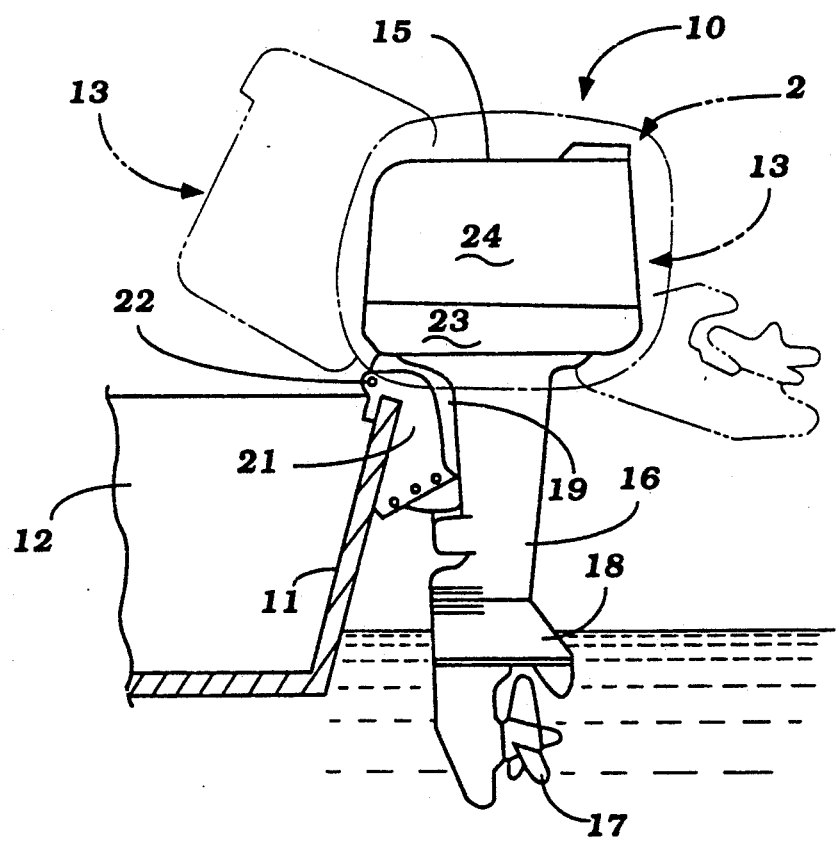
FIG. 1 is a side elevational view of an outboard motor pivotally mounted to the transom of an associated watercraft and constructed in accordance with an embodiment of the invention.
Figure 2:
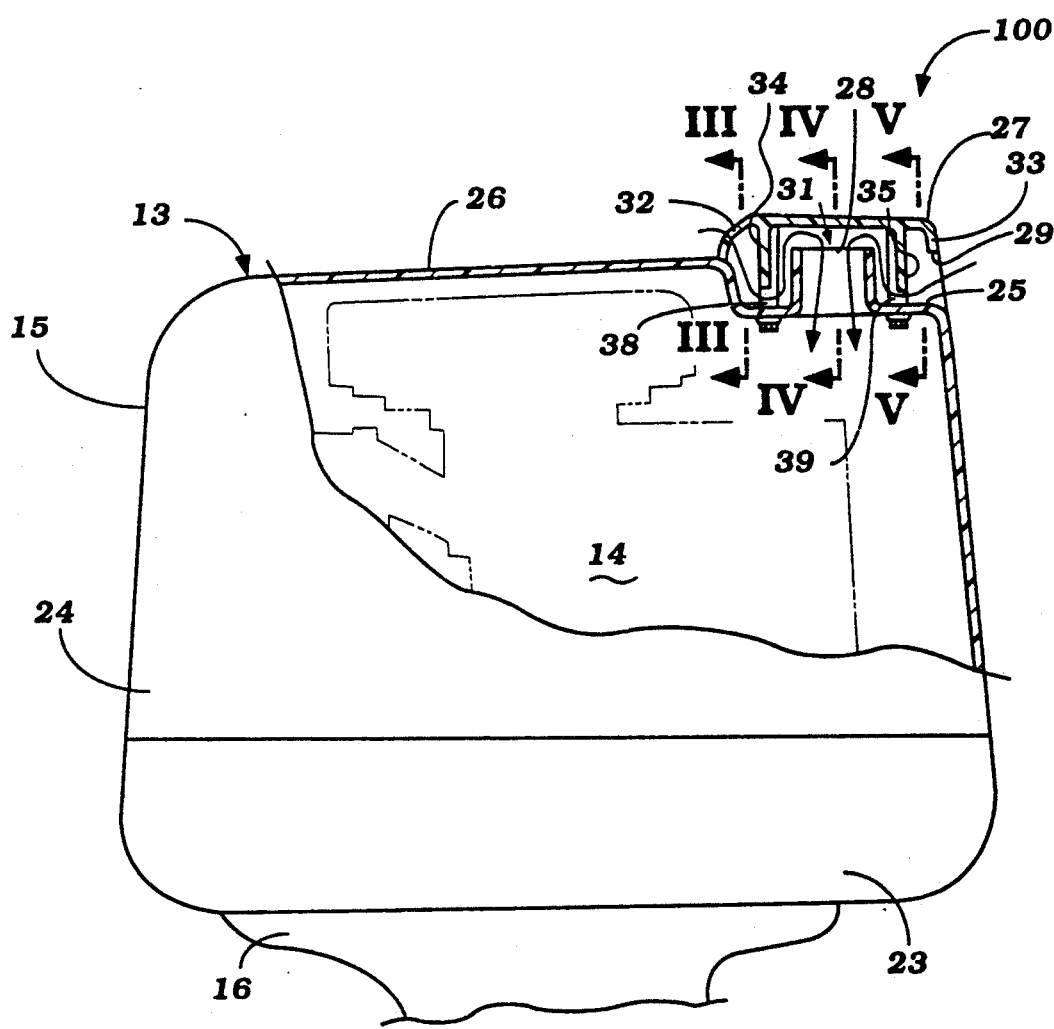
FIG. 2 is an enlarged side elevational view of the power head of the outboard motor with portions shown in cross section and portions broken away, showing the encircled section II of FIG. 1.
Figure 3:
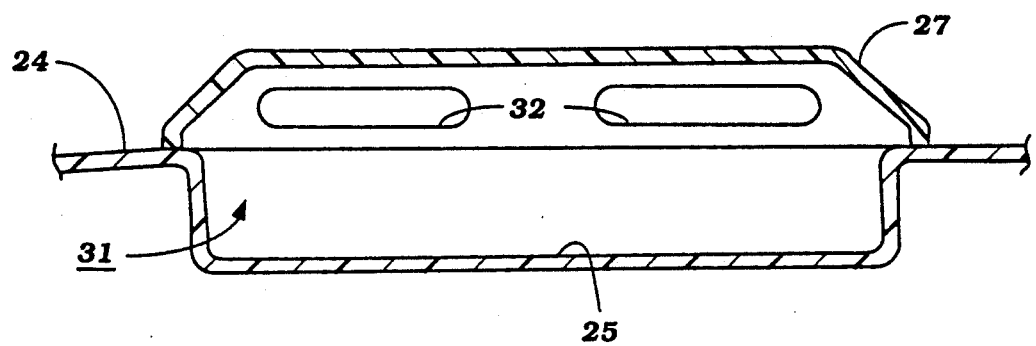
FIG. 3 is an enlarged cross sectional view taken along line III—III of FIG. 2.
Figure 4:
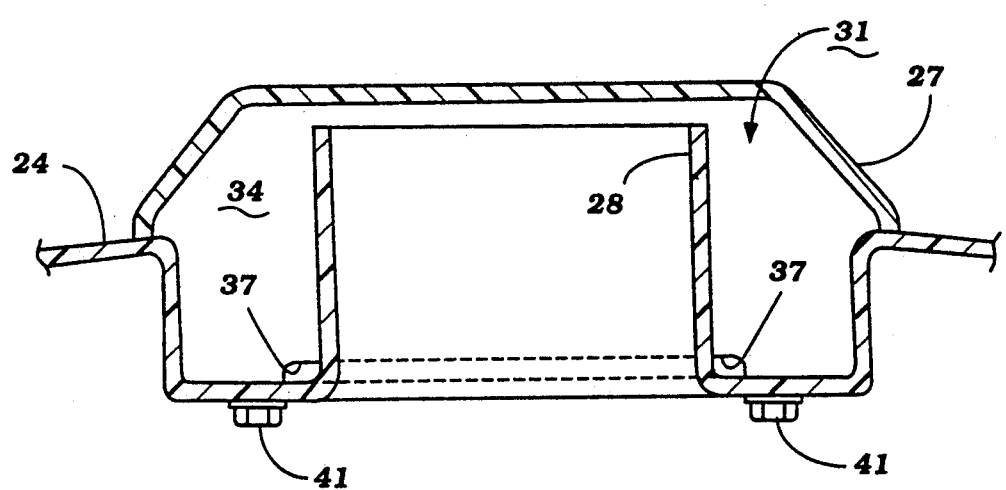
FIG. 4 is an enlarged cross sectional view taken along line IV—IV of FIG. 2.
Figure 5:
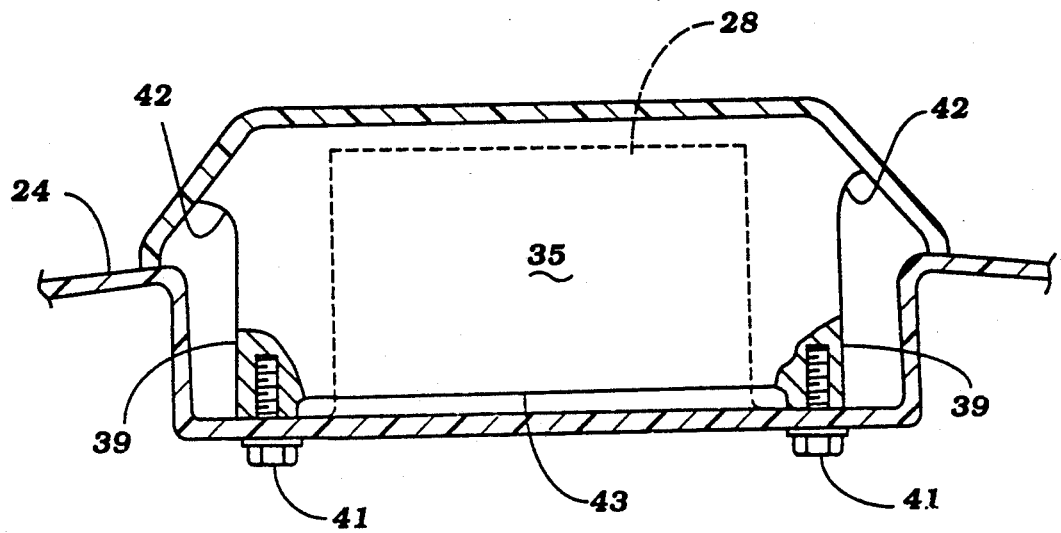
FIG. 5 is an enlarged cross sectional view taken along line V—V of FIG. 2.

Referring first to FIG. 1, an outboard motor constructed in accordance with an embodiment of the invention is identified generally by the reference numeral 10 and is shown as attached to a transom 11 of an associated watercraft 12. The outboard motor 10 includes a power head, indicated generally by the reference numeral 13, that contains an internal combustion engine 14 (see FIG. 2) and which is surrounded by a protective cowling 15 and air inlet device 100 (see FIG. 2) constructed in accordance With a first embodiment of the invention. The internal combustion engine 14 (which is not shown in any detail in the figures and may be of any known type) drives an output shaft which, in turn, drives a driveshaft that is journalled for rotation within a driveshaft housing 16 that depends from the power head 13. This drive shaft (not shown) drives a propeller 17 of a lower unit 18 by means of a conventional forward, reverse, neutral transmission (not shown).

A steering shaft is affixed to the drive shaft housing 16 in a known manner and is supported for steering movement about a generally vertically extending steering axis within a swivel bracket assembly 19. The swivel bracket assembly 19 is, in turn, pivotally connected to a clamping bracket 21 by means of a pivot pin 22 for tilt and trim movement of the outboard motor 10. The clamping bracket 21 includes means for affixing the outboard motor 10 to the transom 11 of the watercraft 12.

The construction of the outboard motor 10 as thus far described except for the cowling 15 and air inlet device 100 may be considered conventional and, for that reason, those components which are not illustrated and which have not been described in any more detail may take the form of any of the known components used in this field.

Referring now in detail to the remaining figures of this first embodiment (FIGS. 2 through 5), the protective cowling 15 of the power head 13 is comprised of a tray portion 23 that is affixed to the lower end of the internal combustion engine 14, and a top cover indicated generally by the reference numeral 24 and typically formed from a light weight plastic material. This top cover 24 has a generally inverted cup shape that carries a pair of latch keepers that are formed at the lower end thereof for cooperation with releasable latch mechanisms carried by the tray 23 for detachably affixing the top cover 24 to the tray 23. When so affixed, this top cover 24 defines a cavity in which the internal combustion engine 14 and its associated parts are contained.

The engine 14 contained within the cavity includes an induction system and air must be supplied to this induction system through a suitable inlet, since the top cover 24 generally fully encloses the internal combustion engine 14. Accordingly, air inlet means 25 is formed in an upper rear surface of the top cover 24 and open to the rearward of the top cover 24. The air inlet means 25 has sufficient flow area so as to adequately serve the induction system needs of the internal combustion engine 14.

The top cover 24 includes an upper surface 26 which defines the top portion of the top cover 24. The forward end of a duct cover 27 adjoins the rearward end of the upper surface 26 and covers an air intake duct 28 formed within the air inlet means 25. This cove 27 is positioned upward of the air intake duct 28. This cover 27 further includes a handle 33 which extends downwardly at the rearward end of the cover 27 to define a rearward opening 29 in the air inlet means 25. This handle 33 is used for tilting up the outboard motor 10.

In accordance with the invention, the air intake duct 28 extends upwardly from the base of the air inlet means 25 and may be mounted thereon and has an opening at the top thereof which is higher than the upper surface 26 into which air is drawn for supply to the engine induction system. The middle portion of the top of the duct cover 27 is also higher than the upper surface 26 so as to accommodate the air intake duct 28 below it and to define a chamber 31 of sufficiently large area within the air inlet means 25 so as to reduce noise resulting from air flow around the top of the air intake duct 28. This cover 27 is adapted to define, or at least cooperate in defining a flow path for air through the air inlet means 25 to the air intake duct 28. In this first embodiment of the invention, the duct cover 27 further includes a pair of air supply openings 32 formed in the forward portion of the cover 27 near where the cover 27 adjoins the upper surface 26 for inducting air from the atmosphere into the air inlet means 25.

In accordance with this first embodiment of the invention, a pair of partition plates 34 and 35 are positioned latitudinally within the air inlet means 25. One partition plate 34 is positioned forwardly of the air intake duct 28 but rearwardly of the air supply openings 32, while the other partition plate 35 is positioned rearwardly of the air intake duct 28 but forwardly of the rearward opening 29. These partition plates 34 and 35 are preferably integrally formed with the lower surface of the duct cover 27. These partition plates 34 and 35 extend downwardly from the duct cover 27 to the base of the air inlet means 25 and serve to prevent water from entering into the air intake duct 28. However, in accordance with this embodiment of the invention, the partition plate 34 positioned forwardly of the air intake duct 28 has an opening 37, preferably in the form of a slit at the lower portion thereof to permit air to flow therethrough and into the air intake duct 28.

This partition plate 34 is supported by a first pair of columns 38 which adjoin the forwardly facing wall of the partition plate 34, one at each end of that wall. These columns 38 extend between the lower surface of the duct cover 27 and the base of the air inlet means 25. A second pair of columns 39 adjoin the forwardly facing wall of partition plate 35, one at each end of that wall and give support to the partition plate 35. These pairs of columns 38 and 39 are secured to the cover 27, and may also be secured to partition plates 34 and 35 respectively, so that the cover 27 can be detachably connected to the top cover 24 by bolts 41.

The partition plate 35 positioned rearwardly of the air intake duct 28 has a pair of openings 42 therein, one at each end and outside of the column 39 on that end, and another opening in the form of a slit 43 at the lower portion of the partition plate 35.

In operation of this first embodiment, this cowling 15 and air inlet device 100 draws in atmospheric air into the air inlet means 25 from both a forwardly and a rearwardly direction and channels that air into the air intake duct 28 for supply to the engine induction system. Air is drawn in from the front of the air inlet means 25 through air supply openings 32 in the duct cover 27. This air travels downwardly and through the opening 37 in partition plate 34. The air then makes an upward turn toward the cover 27 where it is channeled downward into the air intake duct 28. The air that enters through the rearward opening 29 of the air inlet means 25 is drawn through openings 42 and 43 in partition plate 35 and is then drawn into the air intake duct 28.

Figure 6:
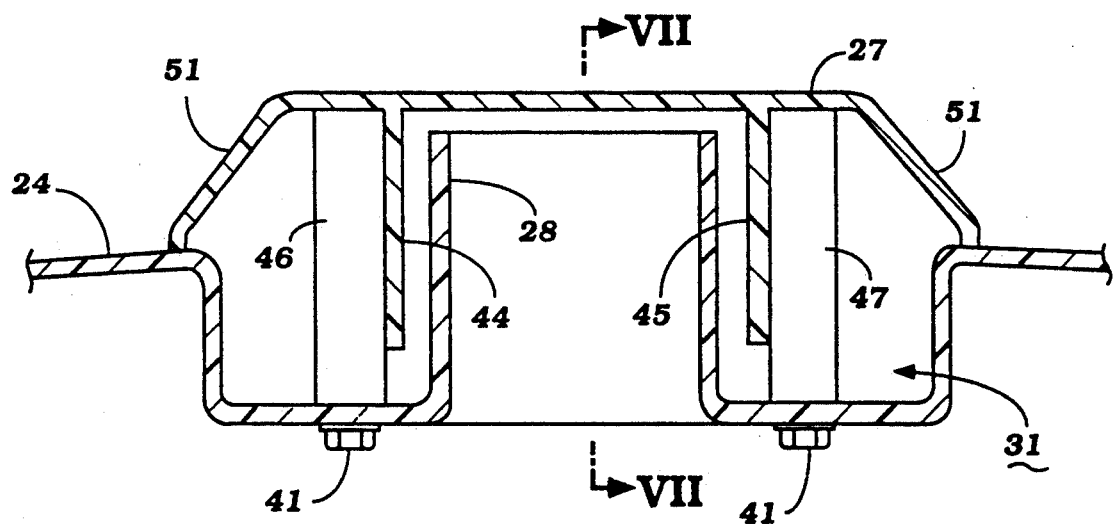
FIG. 6 is an enlarged cross sectional view of the cowling and air inlet device viewed from the rear of the power head and showing a second embodiment of the invention.
Figure 7:
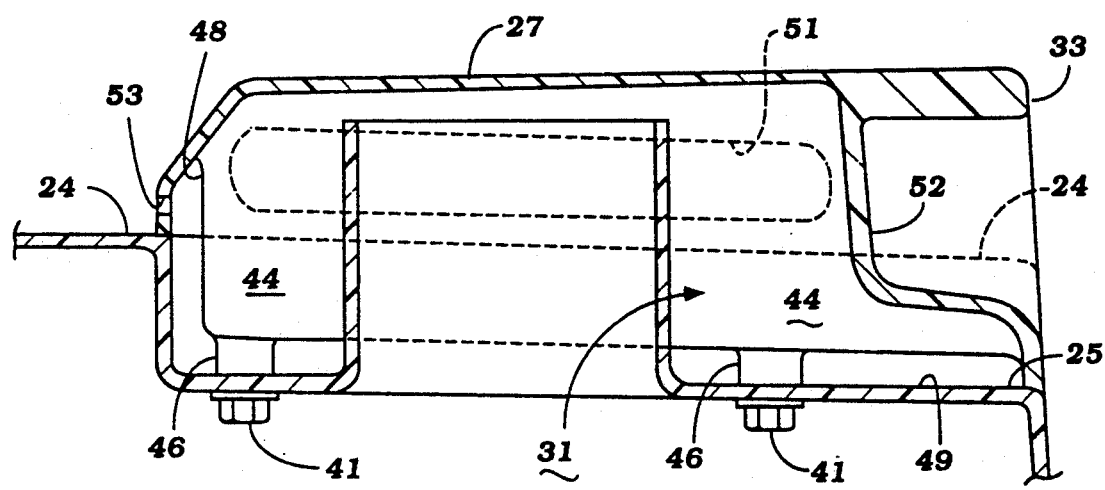
FIG. 7 is an enlarged cross sectional view taken along line VII—VII of FIG. 6.

FIGS. 6 and 7 show a second embodiment of the invention. This embodiment includes a pair of partition plates 44 and 45 similar to the partition plates 34 and 35 of the first embodiment, except that these partition plates 44 and 45 are positioned longitudinally within the air inlet means 25, one plate 44 on the port side of the air intake duct 28 and the other plate 45 on the starboard side of the duct 28. These partition plates 44 and 45 are each supported by a pair of columns 46 and 47 respectively, which are similar to the pairs of columns 38 and 39 of the first embodiment. The pair of columns 46 adjoin and may be secured to the outwardly facing wall of partition plate 44, one at each end of that wall. In a like manner, each of the columns 47 adjoin and may be secured to the outwardly facing wall of partition plate 45, one at each end of that wall. These columns 46 and 47 are secured to the cover 27 and provide the means, along with bolts 41, for detachably connecting the cover 27 to the top cover 24.

In accordance with this second embodiment of the invention, these partition plates 44 and 45 each have an opening 48, one at the forward end of each plate 44 and 45, and each have an opening 49 in the form of a slit at the bottom portion of each plate 44 and 45, to permit air from the atmosphere to enter the air intake duct 28. The cover 27, in this embodiment, is provided with a pair of air supply openings 51, one formed on each side of the cover 27 for inducting atmospheric air into the air inlet means 25. The cover 27 is further provided with a rear section 52 for closing the rear opening except a small drain hole (not shown) so as to further prevent water from entering the air intake duct 28, particularly during deceleration of the outboard motor 10 and watercraft 12. In this embodiment, the cover 27 is also provided with a water outlet 53 in the forward portion thereof for draining any water that may accumulate within the air inlet means 25 as a result of condensation. As with the first embodiment, the cover is positioned upward of the air intake duct 28 and a portion of the top of the cover 27 is higher than the upper surface of the cowling 26 so as to define, or at least cooperate in defining a flow path for air through the air inlet 25 to the intake duct 28.

Figure 8:
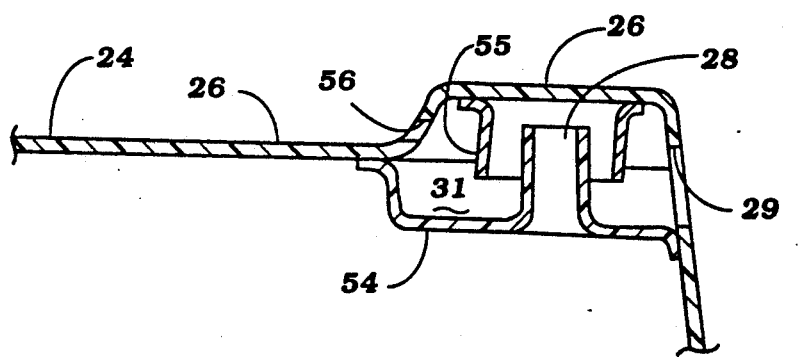
FIG. 8 is an enlarged cross sectional view of the cowling and air inlet device showing a third embodiment of the invention.

A third embodiment of the invention is shown in FIG. 8, wherein the upper surface of the top cover 26 has a protruded portion which functions as a cover and extends over the air intake duct 28 to define a rearward opening 29 in the air inlet means 25. The protruded portion is higher, at least in part, than the upper surface of the cowling 26 to define, or at least cooperate in defining a flow path for air through the air inlet means 25 to the air intake duct 28. An air supply opening 56 is provided in the forward portion of the protruded portion. A bottom plate 54 forms the base of the air inlet means 25 and cooperates in defining a chamber 31 therein. The air intake duct 28 extends upwardly from the bottom plate 54 and has an opening at the top thereof which is higher than the unprotruded portion of the upper surface 26. A partition member 55 surrounds the top portion of the air intake duct 28. This partition member 55 is preferably integrally formed with the lower surface of the protruded portion of the upper surface 26 and extends downwardly therefrom to help prevent water from entering the air intake duct 28 but to permit air to flow therein. As with the other embodiments, this one also provides an arrangement which reduces the noise resulting from air flow through the air inlet means 25 and around the top of the air intake duct 28.

It should be readily apparent from the foregoing description that several embodiments of the invention have been illustrated and described, each of which is highly effective in providing adequate air flow for the induction system of the internal combustion engine, in insuring that water will not enter the induction system or the cavity that surrounds the engine, and in reducing the noise resulting from air flow around the top of the air intake duct. Although this is the case, various changes and modifications may be made without departing from the spirit and scope of the invention, as defined by the appended claims.

We claim:

1. A cowling and air inlet device for the power head of an outboard motor having an internal combustion engine including an induction system, comprising a side wall surrounding the engine and a top cover covering the engine, air inlet means formed in said top cover, said top cover comprising a first part which covers a substantial portion of said internal combustion engine and a second part positioned lower than said first part to form a base of said air inlet means, air intake means formed within said air inlet means extending upwardly from said base to a position higher than the highest point of said first part of said top cover and having an opening at the top thereof higher than the highest point of said first part of said top cover for supplying air to said induction system, said air inlet means further comprising a cover adjoining and extending from said first part of said top cover for covering said air intake means, said air inlet means cover cooperating with said base to form an air inlet opening for inducting air from the atmosphere into said air inlet means for supply to said air intake means, said air inlet means cover having at least one air supply opening formed therein, a substantial portion of the top of said air inlet means cover being higher than said first part of said top cover so as not to lie in the same general plane as said first part of said top cover to define a flow path for air through said air inlet means to said air intake means.

2. A cowling and air inlet device as recited in claim 1, wherein said air inlet means further comprises a partition plate positioned therein between said air supply opening and said air intake means.

3. A cowling and air inlet device as recited in claim 1, wherein said at least one air supply opening is formed in the forward portion of said air inlet means cover higher than said first part of said top cover.

4. A cowling and air inlet device as recited in claim 1, wherein said air inlet means further comprises a pair of partition plates positioned therein one forwardly and one rearwardly of said air intake means.

5. A cowling and air inlet device for the power head of an outboard motor having an internal combustion engine including an induction system, comprising a side wall surrounding the engine and a top cover covering the engine, air inlet means formed in said top cover, said top cover comprising a first part which covers a substantial portion of said internal combustion engine and a second part positioned lower than said first part to form a base of said air inlet means, air intake means formed within said air inlet means extending upwardly from said base to a position higher than the highest point of said first part of said top cover and having an opening at the top thereof higher than the highest point of said first part of said top cover for supplying air to said induction system, said air inlet means further comprising a pair of partition plates positioned therein one on each side of said air intake means and a cover adjoining and extending from said first part of said top cover for covering said air intake means, said air inlet means cover cooperating with said base to form an air inlet opening for inducting air from the atmosphere into said air inlet means for supply to said air intake means, said air inlet means cover having a pair of air supply openings formed therein one on each side, a substantial portion of the top of said air inlet means cover being higher than said first part of said top cover so as not to lie in the same general plane as said first part of said top cover to define a flow path for air through said air inlet means to said air intake means.

6. A cowling and air inlet device as recited in claim 5, wherein said air supply openings are formed higher than said first part of said top cover.

7. A cowling and air inlet device for the power head of an outboard motor having an internal combustion engine including an induction system, comprising a side wall surrounding the engine and a top cover covering the engine, air inlet means formed in said top cover, said top cover comprising a first part which covers a substantial portion of said internal combustion engine and a second part positioned in substantial part higher than said first part to form a cover of said air inlet means, a base positioned lower than said first part to form a base of said air inlet means, air intake means formed within said air inlet means extending upwardly from said base to a position higher than the highest point of said first part of said top cover and having an opening at the top thereof higher than the highest point of said first part of said top cover for supplying air to said induction system, said air inlet means further comprising a partition member positioned therein surrounding said intake means, said air inlet means cover covering said air intake means and having at least one air supply opening formed therein, said air inlet means cover cooperating with said base to form an air inlet opening for inducting air from the atmosphere into said air inlet means for supply to said air intake means, a substantial portion of said air inlet means cover being higher than said first part of said top cover so as not to lie in the same general plane as said first part of said top cover to define a flow path for air through said air inlet means to said air intake means.

* * * * *